United States Patent
Schemmann et al.

(10) Patent No.: US 9,479,263 B2
(45) Date of Patent: Oct. 25, 2016

(54) EML BIAS CONTROL SYSTEM

(71) Applicant: ARRIS Enterprises, Inc., Suwanee, GA (US)

(72) Inventors: Marcel Schemmann, Maria Hoop (NL); Shamsuddin Chasmawala, Middletown, CT (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/243,984

(22) Filed: Apr. 3, 2014

(65) Prior Publication Data

US 2015/0288457 A1    Oct. 8, 2015

(51) Int. Cl.
*H04B 10/00* (2013.01)
*H04B 10/58* (2013.01)
*H04B 10/516* (2013.01)
*G02F 1/01* (2006.01)
*H04B 10/50* (2013.01)
*H04N 7/22* (2006.01)
*G02F 1/03* (2006.01)

(52) U.S. Cl.
CPC ............. *H04B 10/58* (2013.01); *G02F 1/0123* (2013.01); *G02F 1/0327* (2013.01); *H04B 10/50572* (2013.01); *H04B 10/516* (2013.01); *H04N 7/22* (2013.01)

(58) Field of Classification Search
USPC ........................................................ 398/198
See application file for complete search history.

(56) References Cited

U.S. PATENT DOCUMENTS

| 5,745,282 A | 4/1998 | Negi |
| 5,875,048 A | 2/1999 | Nemecek et al. |
| 6,917,639 B2* | 7/2005 | Ishida ............... H01S 5/042 372/29.015 |
| 7,711,272 B2* | 5/2010 | Blauvelt ............ H04B 10/58 398/197 |
| 8,184,991 B2* | 5/2012 | Farina ............. H04B 10/50572 398/182 |
| 8,346,097 B1* | 1/2013 | Benzoni ........... H04B 10/25759 398/195 |
| 8,364,038 B2* | 1/2013 | Mizuguchi ......... H04B 10/5053 398/185 |
| 8,385,751 B2* | 2/2013 | Lyubomirsky ...... H04J 14/0278 398/183 |
| 8,532,499 B2* | 9/2013 | Caton ............... H04B 10/5051 359/245 |
| 8,588,621 B2* | 11/2013 | Dahan ................ H04B 10/505 359/238 |
| 8,655,188 B2* | 2/2014 | Oku ..................... H04B 10/504 398/192 |
| 8,891,975 B2* | 11/2014 | Yagisawa ..................... 398/200 |
| 2009/0232517 A1* | 9/2009 | Farina ............. H04B 10/50572 398/183 |
| 2015/0288457 A1* | 10/2015 | Schemmann ........ H04B 10/516 398/194 |

FOREIGN PATENT DOCUMENTS

EP    412830 A3    7/1992

OTHER PUBLICATIONS

Y. Bao, et al., "Nonlinearity mitigation for high-speed optical OFDM transmitters using digital pre-distortion" Optics Express, vol. 21, No. 6, Mar. 2013, pp. 7354-7361.
R. Sankaralingam, "Eelctroabsorption Modulators", EE698, 16 pgs.
PCT Search Report and Written Opinion for PCT/US2015/022586, mail date Jun. 22, 2015.

* cited by examiner

*Primary Examiner* — Agustin Bello
(74) *Attorney, Agent, or Firm* — Lori Anne D. Swanson

(57) ABSTRACT

Systems and methods of minimizing distortion produced when modulating an optical signal using an electrical signal.

20 Claims, 8 Drawing Sheets

CORRELATION BETWEEN EML SECOND ORDER DISTORTION AND RF DISTORTION PRODUCT

EML BIAS CONTROL SYSTEM

CROSS-REFERENCE TO RELATED APPLICATIONS

None

BACKGROUND

The present disclosure relates to systems and methods that provide optical signals over a cable transmission network.

Referring to FIG. 1, cable TV (CATV) systems were initially deployed as video delivery systems. In its most basic form, the system received video signals at the cable head end, processed these for transmission, and broadcast them to homes via a tree and branch coaxial cable network. In order to deliver multiple TV channels concurrently, early CATV systems assigned 6 MHz blocks of frequency to each channel and Frequency Division Multiplexed (FDM) the channels onto the coaxial cable RF signals. Amplifiers were inserted along the path as required to boost the signal, and splitters and taps were deployed to enable the signals to reach the individual homes. Thus, all homes received the same broadcast signals.

As the reach of the systems increased, the signal distortion and operational cost associated with long chains of amplifiers became problematic, and segments of the coaxial cable were replaced with fiber optic cables to create a Hybrid Fiber Coax (HFC) network to deliver the RF broadcast content to the coaxial neighborhood transmission network. Optical nodes in the network acted as optical to electrical converters to provide the fiber-to-coax interfaces.

As the cable network evolved, broadcast digital video signals were added to the multiplexed channels. The existing 6 MHz spacing for channels was retained, but with the evolving technology, each 6 MHz block could now contain multiple programs. Up to this point, each home received the same set of signals broadcast from the head end so that the amount of spectrum required was purely a function of the total channel count in the program line-up.

The next major phase in CATV evolution was the addition of high speed data service, which is an IP packet-based service, but appears on the HFC network as another 6 MHz channel block (or given data service growth, more likely as multiple 6 MHz blocks). These blocks use FDM to share the spectrum along with video services. Unlike broadcast video, each IP stream is unique. Thus, the amount of spectrum required for data services is a function of the number of data users and the amount of content they are downloading. With the rise of the Internet video, this spectrum is growing at 50% compound annual growth rate and putting significant pressure on transmission quality parameters such as available bandwidth, signal distortion, etc. Such pressure has been further increased with the advent of narrowcast video services such as video-on-demand (VOD), which changes the broadcast video model as users can select an individual program to watch and use VCR-like controls to e.g. start, stop, and fast-forward. In this case, as with data service, each user requires an individual program stream.

FIG. 1 shows part of the cable TV infrastructure, which includes the cable head end, the Hybrid Fiber Coax (HFC) transmission network, and the home. The CATV head end receives incoming data and video signals from various sources (e.g., fiber optic links, CDN's, DBS satellites, local stations, etc.). The video signals are processed (reformatting, encryption, advertising insertion etc.) and packaged to create the program line up for local distribution. This set of video programs is combined with data services and other system management signals and prepared for transmission over the HFC to the home. All information (video, data, and management) is delivered from the head end over the HFC network to the home as RF signals. In the current practice, systems in the head end process the signals, modulate them to create independent RF signals, combine these into a single broadband multiplex, and transmit this multiplex to the home. The signals (different video channels and one or more data and management channels) are transmitted concurrently over the plant at different FDM frequencies. In the home, a cable receiver decodes the incoming signal and routes it to TV sets or computers as required.

Cable receivers, including those integrated into set-top boxes and other such devices, typically receive this information from the head end via coaxial transmission cables. The RF signal that is delivered can simultaneously provide a wide variety of content, e.g. high speed data service and up to several hundred television channels, together with ancillary data such as programming guide information, ticker feeds, score guides, etc. Through the cable receiver's output connection to the home network, the content is delivered to television sets, computers, and other devices. The head end will typically deliver CATV content to many thousands of individual households, each equipped with a compatible receiver.

Cable receivers are broadly available in many different hardware configurations. For example, an external cable receiver is often configured as a small box having one port connectable to a wall outlet delivering an RF signal, and one or more other ports connectable to appliances such as computers, televisions, and wireless routers or other network connections (e.g., 10/100/1,000 Mbps Ethernet). Other cable receivers are configured as circuit cards that may be inserted internally in a computer to similarly receive the signals from an RF wall outlet and deliver those signals to a computer, a television, or a network, etc. Still other cable receivers may be integrated into set-top boxes, which receive an input signal via an RF cable, decode the RF signal to separate it into distinct channels or frequency bands providing individual content, and provides such content to a television or other audio or audiovisual device in a manner that permits users to each select among available content using the set top box.

As previously mentioned, the CATV transmission architecture has been modified to permit data to flow in both directions, i.e. data may flow not only from the head end to the viewer, but also from the viewer to the head end. To achieve this functionality, cable operators dedicate one spectrum of frequencies to deliver forward path signals from the head end to the viewer, and another (typically much smaller) spectrum of frequencies to deliver return path signals from the viewer to the head end. The components in the cable network have been modified so that they are capable of separating the forward path signals from the return path signals, and separately amplifying the signals from each respective direction in their associated frequency range.

FIG. 2 shows a Hybrid/Fiber Coax (HFC) cable network. A head end system 120 includes multiple devices for delivery of video and data services including EdgeQAMS (EQAMs) for video, cable modem termination systems (CMTS) for data, and other processing devices for control and management. These systems are connected to multiple fiber optic cables 100 that go to various neighborhood locations that each serve a smaller community. A fiber optic neighborhood node 130 is located between each fiber optic cable 120 and a corresponding trunk cable 140, which in turn is interconnected to the homes 160 through branch networks and feeder cables 150. Because the trunk cable 140, as well as the branch networks and feeder cables 150, each propagate RF signals using coaxial cable, the nodes 130 convert the optical signals to electrical signals that can be transmitted through a coaxial medium, i.e. copper wire. Similarly, when electrical signals from the home reach the node 130 over the coaxial medium, those signals are converted to optical signals and transmitted across the fiber optic cables 100 back to the systems at the head end 120. The trunk cables 140 and/or feeder cables 150 may include amplifiers 170. Connected to each trunk cable 140 is a branch network that connects to feeder cables (or taps) that each enter individual homes to connect to a respective cable receiver. This is generally referred to as Fiber-to-the-Neighborhood (FTTN) or Fiber-to-the-Curb (FTTC), depending on how close the optical nodes are to the viewer's home.

Hybrid fiber/coax networks generally have a bandwidth of approximately 500 MHz or more. Each television channel or other distinct content item transmitted along the forward path from the head end to a user may be assigned a separate frequency band, which as noted earlier has a typical spectral width of 6 MHz. Similarly, distinct content delivered along the return path from a user to the head end may similarly be assigned a separate frequency band, such as one having a spectral width of 6 MHz. In North America, the hybrid fiber/coax networks assign the frequency spectrum between 5 MHz and 42 MHz to propagate signals along the return path, and assign the frequency spectrum between 50 MHz and 750 MHz or more to propagate signals along the forward path.

Referring to FIG. 3, a cable modem termination system (CMTS) 200 may be installed at the head end, which instructs each of the cable modems when to transmit return path signals, such as Internet protocol (IP) based signals, and which frequency bands to use for return path transmissions. The CMTS 200 demodulates the return path signals, translates them back into (IP) packets, and redirects them to a central switch 210. The central switch 210 redirects the IP packets to an IP router 220 for transmission across the Internet 230, and to the CMTS which modulates forward path signals for transmission across the hybrid fiber coax cables to the user's cable modem. The central switch 210 also sends information to, and receives information from, information servers 240 such as video servers. The central switch 210 also sends information to, and receives information from, a telephone switch 250 which is interconnected to the telephone network 260. In general, cable modems are designed to only receive from, and send signals to, the CMTS 200, and may not communicate directly with other cable modems networked through the head end.

Using this architecture, forward path signals from the head-end are broadcast to all cable modem users on the same network or sub-network. Each cable modem filters out the portion of the signal it needs, which may then be selectively provided to the user. Along the return path, each cable modem delivers a signal to the head end through the CATV network, and which occupies a part of a spectrum shared among other cable modems. Therefore, the system may regulate which modem's return path signal is delivered to the network at which time using time or frequency division multiple access (TDMA or FDMA),

DETAILED DESCRIPTION

Figure 1:
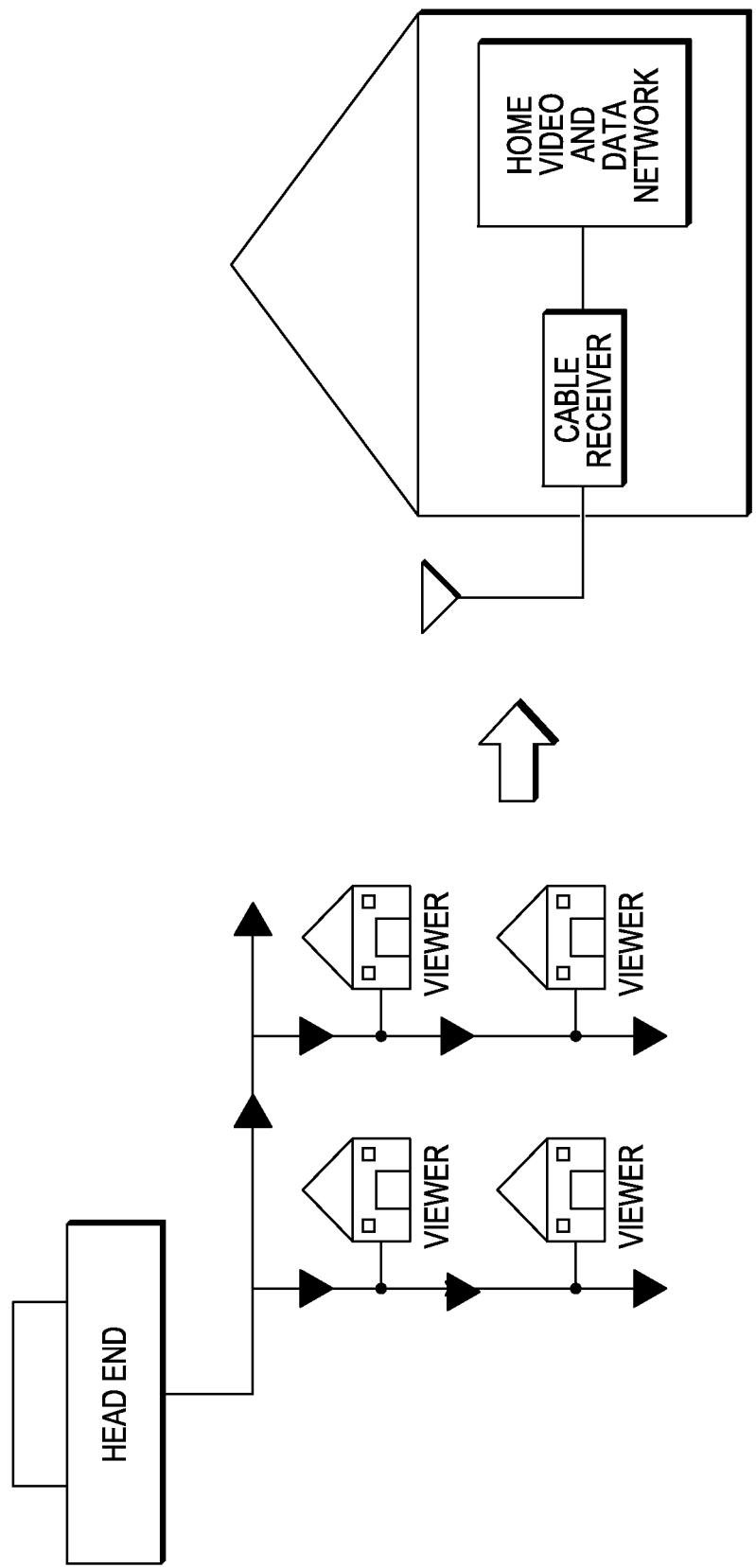
FIG. 1 shows an exemplary CATV network including a head end that delivers CATV content to a plurality of homes.
Figure 2:
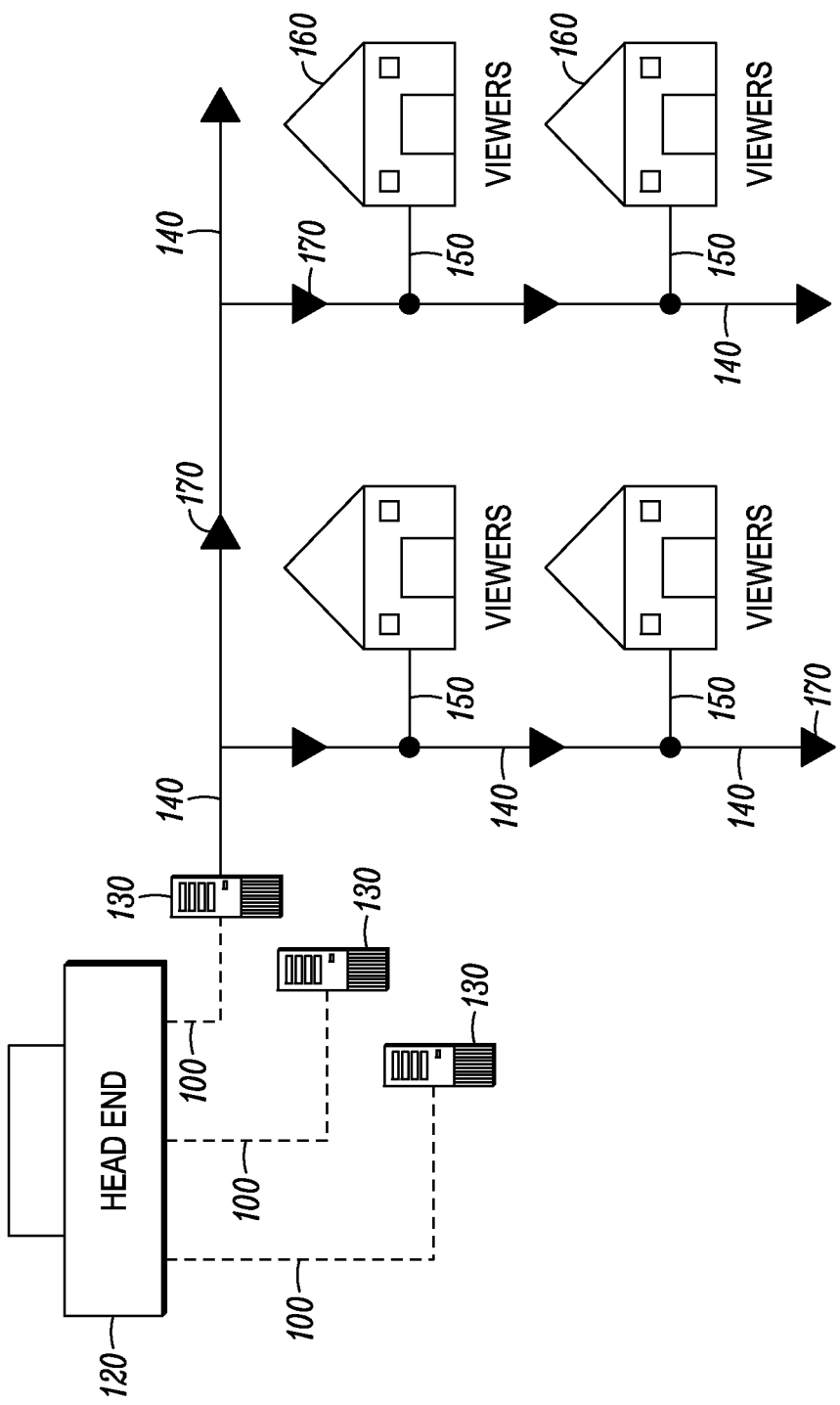
FIG. 2 shows an exemplary Hybrid/Fiber Coax CATV network, including a head end that delivers CATV content to a plurality of homes.
Figure 3:
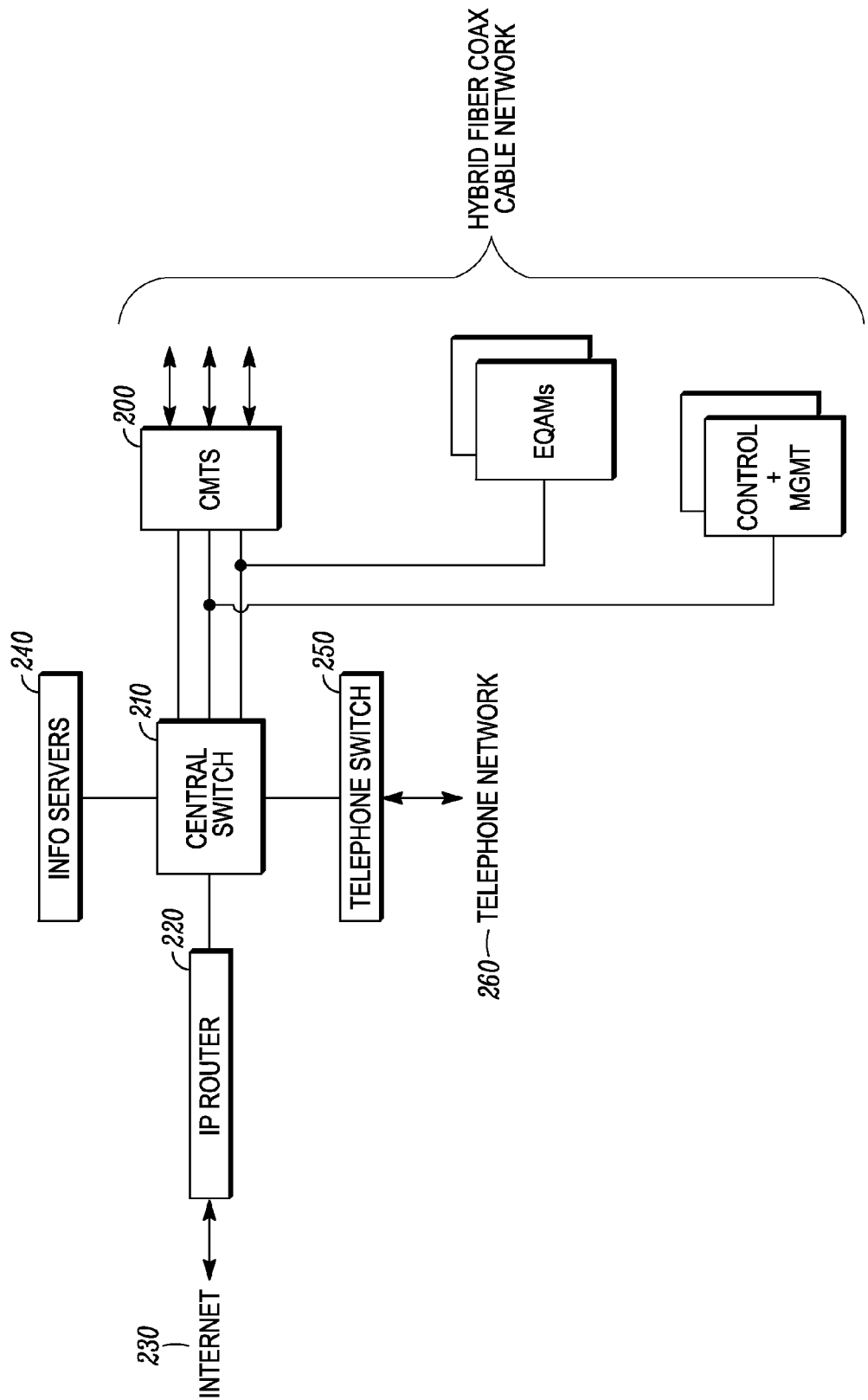
FIG. 3 shows an exemplary architecture of a head end, such as the ones shown in FIGS. 1 and 2.
Figure 4:
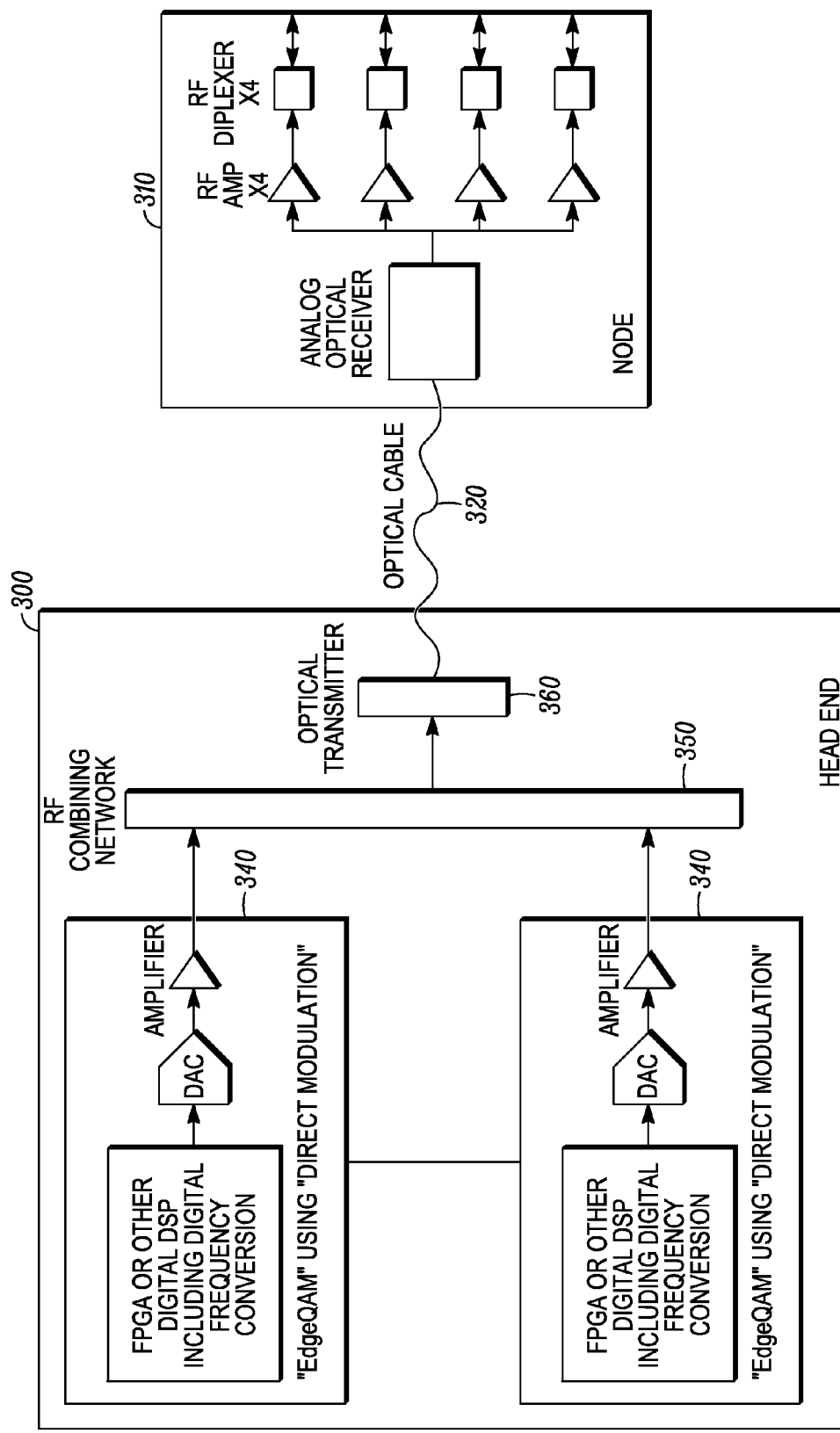
FIG. 4 shows an exemplary CATV delivery architecture that may include an improved optical transmitter.

FIG. 4 shows an exemplary architecture for delivering CATV content from a head end 300 to a node 310. The head end 300 may in some instances include a plurality of direct modulation EdgeQAM units 340 which each receive digitally encoded video signals, audio signals, and/or IP signals, and each directly outputs a spectrum of amplitude-modulated analog signal at a defined frequency or set of frequencies to an RF combining network 350, which in turn combines the received signals. An optical transmitter 360 then sends the entire spectrum of the multiplexed signals as an analog transmission through an optical fiber 320 along a forward path to the node 310. In the specification, the drawings, and the claims, the terms "forward path" and "downstream" may be interchangeably used to refer to a path from a head end to a node, a node to an end-user, or a head end to an end user. Conversely, the terms "return path", "reverse path" and "upstream" may be interchangeably used to refer to a path from an end user to a node, a node to a head end, or an end user to a head end. Also, it should be understood that, unless stated otherwise, the term "head end" will also encompass a "hub," which is a smaller signal generation unit downstream from a head end, often used for community access channel insertion and other purposes, that generally mimics the functionality of a head end, but may typically not include equipment such as satellite dishes and telephone units. Hubs are commonly known to those skilled in the art of the present disclosure.

Directly-modulated EdgeQAM units have become increasingly sophisticated, offering successively higher densities, which in turn means that each EdgeQAM unit can process more channels of CATV data. For example, modern EdgeQAM modulation products can now simultaneously generate 32 or more channels on a single output port. With more channels being modulated per output port, the amount of combining required by the RF combining network 350 is reduced, with a corresponding simplification in the circuitry at the head end. The term 'QAM' is often used to interchangeably represent either: (1) a single channel typically 6 MHz wide that is Quadrature Amplitude Modulated (thus a "32 QAM system" is shorthand for a system with 32 Quadrature Amplitude Modulated channels; or (2) the depth of modulation used by the Quadrature Amplitude Modulation on a particular channel, e.g. 256 QAM means the signal is modulated to carry 8 bits per symbol while 4096 QAM means the signal is modulated to carry 12 bits per symbol. A higher QAM channel count or a higher QAM modulation means that a higher number of content "channels" can be delivered over a transmission network at a given standard of quality for audio, video, data, etc. QAM channels are constructed to be 6 MHz in bandwidth in North America, to be compatible with legacy analog TV channels and other existing CATV signals. However, more than one video program or cable modem system data stream may be digitally encoded within a single QAM channel. The term channel is unfortunately often used interchangeably, even though a QAM channel and a video program are not often the same entity—multiple video programs can be and usually are encoded within a single 6 MHz QAM channel. In this case, the modern EdgeQAM modulation products generate multiple instances of the 6 MHz bandwidth QAM channels. This simplifies the head end structure since some subset of the RF combining is now performed within the EdgeQAM units rather than in the external RF combining network. Packaging multiple QAM generators within a single package also offers some economic value.

It should be understood that although FIG. 4 illustrates a head end 300 that utilizes direct modulation EdgeQAMs, other architectures may employ other modulators, such as an analog EdgeQAM modulator or a Converged Cable Access Platform (CCAP) modulation system. Also, although FIG. 4 shows a downstream transmission from a transmitter in the head end 300 to a receiver in the node 310, other configurations may also include an upstream path from a transmitter in the node 310 to a receiver in the head end 300.

As already indicated, there is significant continuing pressure to increase the quality and quantity of data sent over a HFC network. One source of signal degradation in an optical path from a transmitter to a receiver may commonly be introduced by the laser used to deliver a signal onto the fiber optic cable. Specifically, as laser current is either modulated between on/off states for digital transmission or even modulated continuously for analog transmissions, the laser's output will shift in frequency—a phenomenon commonly referred to as laser chirp. Laser chirp, which becomes severe for data rates exceeding 10 Gbps, distorts an optical signal by exacerbating optical dispersion along a fiber-optic cable.

One solution to mitigate laser chirp is to modulate a laser's signal indirectly, i.e. after the signal leaves the laser, rather than modulating the current of the laser. Two typical types of external modulators are Mach-Zehnder modulators and electro-absorption modulators (EAMs). A Mach-Zehnder modulator receives an incoming optical signal and splits it equally, sending the split signals down two respectively different optical paths. After a few centimeters, the two paths recombine, causing the optical waves to interfere with each other. Such an arrangement is known as an interferometer. The phase shift between the two optical signals is controlled by changing the delay through one or both of the optical paths by means of the electro-optic effect. This effect occurs in some materials such as lithium niobate (LiNbO3), some semiconductors, as well as some polymers and causes the refractive index to change in the presence of an electric field. If the phase shift between the two waves is 0° then the interference is constructive and the light intensity at the output is high (on state); if the phase shift is 180° then the interference is destructive and the light intensity is zero (off state).

The EAM consists of an active semiconductor region sandwiched in between a p- and n-doped layer, forming a p-n junction. The EAM works on the principle known as Franz-Keldysh effect, according to which the effective bandgap of a semiconductor decreases with increasing electric field. Without bias voltage across the p-n junction, the bandgap of the active region is just wide enough to be transparent at the wavelength of the laser light. However, when a sufficiently large reverse bias is applied across the p-n junction, the effective bandgap is reduced to the point where the active region begins to absorb the laser light and thus becomes opaque. Thus, an EAM may be effectively used to selectively pass or absorb light emitted by a laser depending on the voltage applied across the p-n junction of the EAM.

Because the electric field in the active region not only modulates the absorption characteristics, but also the refractive index, the EAM produces some chirp. However, this chirp usually is much less than that of a directly-modulated laser. Moreover, because an EAM is small, it can be integrated on the same chip as the laser itself, leading to substantial economies of production and low coupling losses between the laser and the EAM. The combination of a laser with an EAM is typically referred to as an Electro-Absorption Modulated Laser (EML).

Though EMLs offer low-cost, easy integration, low driving voltage and power dissipation, the modulator inherently introduces nonlinear distortions (second order and higher) in the modulated optical signal which results in bit error rate (BER) performance degradation. These distortions vary strongly as a function of the bias point of the EAM, and the a precise point where distortions are minimized is unpredictable and can vary over time. Thus, while it is possible to minimize distortion by selecting an optimal bias point, predicting that bias point precisely and holding it is difficult.

Figure 5:
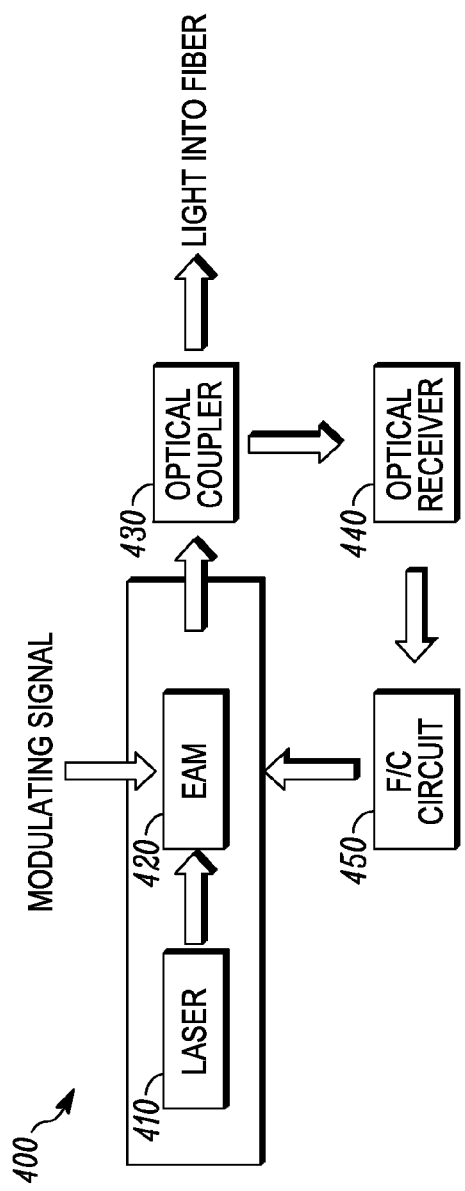
FIG. 5. shows a first exemplary feedback system for an optical transmitter.

FIG. 5 shows an EML 400 comprising a laser 410 and an EAM 420 preferably integrally manufactured on the same substrate, though other embodiments may utilize a laser and EAM manufactured as separate components. The EAM 410 may receive a modulating voltage signal that selectively passes or absorbs light from the laser in a ratio dependent on the voltage that the modulator applies across the p-n junction of the EAM, as described earlier. An optical coupler or splitter 430 preferably receives the signal output from the EAM 420 and passes most of the signal to the fiber to the downstream (or upstream) receiver, but bleeds off a small amount of that signal to an optical receiver 440 which may include a photo-detector (PD) that converts the received optical signal to a voltage and passes that voltage to a feedback and control unit 450. If a Wavelength division multiplexed (WDM) signal is output by the EML, a tunable optical filter (TOF) may be employed to select the channel that needs to be monitored.

The feedback and control unit 450 preferably uses the received voltage to extract the distortion in the feedback signal, and to selectively vary the modulating signal to the EAM to find an optimal bias point. The feedback and control unit 450 may employ any appropriate means to determine the distortion produced by the EAM, e.g. by applying the inverse of the modulator's theoretical transfer function to the feedback signal and comparing it to the original modulating signal, etc. Such feedback and control techniques are well known to those familiar with optical transmission systems for HFC cable networks.

Figure 6:
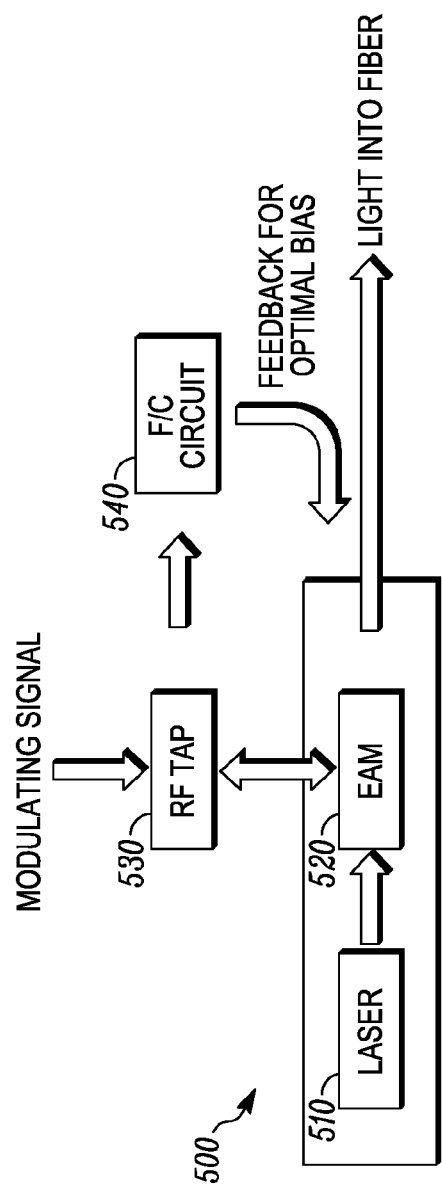
FIG. 6 shows a second exemplary feedback system for an optical transmitter.

While effective at determining an optimal bias point, the system shown in FIG. 5 needs an optical coupler and an optical receiver to determine the optimal bias point for the modulator. These components add cost and significant real estate to the transmitter due to incorporation of an optical receiver in the transmitter itself. FIG. 6 shows an alternative system which includes an EML 500 comprising a laser 510 and an EAM 520 preferably integrally manufactured on the same substrate, though other embodiments may utilize a laser and EAM manufactured as separate components. The EAM 510 may receive a modulating voltage signal used to selectively pass or absorb light from the laser in a ratio dependent on the voltage that the modulator applies across the p-n junction of the EAM, as described earlier.

Unlike the system shown in FIG. 5, the system of FIG. 6 preferably does not include an optical coupler and preferably does not include an optical receiver. Reduction of circuit board real estate is of key importance when transmitters are designed for smaller packages like XFP (eXtra Fine Pitch pluggable package), SFP (Small Form Factor pluggable package) etc. Rather than using an optical coupler and an optical receiver, an RF tap 530 may be connected to the same input pin of the EAM 520 that receives the modulating signal. The RF tap 530 preferably bleeds off a portion of the input signal to the EAM. The present inventors realized that the optical distortion produced by the EAM will be reflected in part back into the electrical input signal, and thus though counterintuitive, the input signal to the EAM may be analyzed to extract the distortion that the EAM imparts to the optical output of the EAM. More specifically, a feedback/control unit 540 may receive the electrical signal from the RF tap and analyze that signal to extract a distortion product if the EAM. Preferably, the distortion product extracted is a second order distortion, though higher order distortions may be extracted, as well. The distortion signal or signals extracted may then be used as feedback to select an optimal bias for the EAM.

Figure 7:
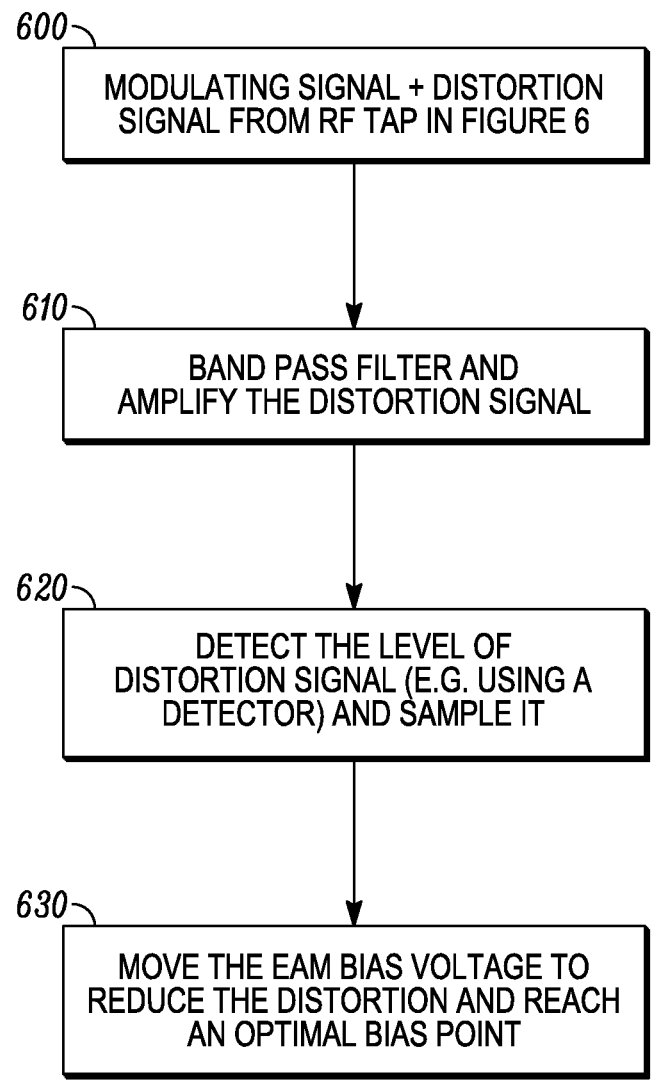
FIG. 7 shows an exemplary method for operating the feedback system of FIG. 6

FIG. 7 shows an exemplary method by which the feedback and control unit 540 modulates the bias of the EAM 520. In a first step 600 the feedback and control unit 540 receives a voltage signal from the RF tap 530. As noted earlier, this voltage signal will include both the modulating signal to the EAM 520 and a distortion signal reflected from the EAM 520 through its input pin. In step 610 the voltage signal from the RF tap is band pass filtered and amplified. One method of filtering the signal is to low-pass filter the signal such that the modulating signal itself is rejected. This is particularly applicable in a CATV system with a forward band that starts at 54 MHz and continues for instance to 1.2 GHz. The modulating signal has no components below 54 MHz but the distortion does cause products below 54 MHz. For channel plans with 6 MHz separation, as is common in NTSC frequency plans, second order distortion signals tend to be visible at 6, 12 and higher multiples of 6 MHz and a bandpass filter can be used to preferably detect such frequencies. In step 620 the distortion signal is distinguished from the modulating signal by a suitable detector and sampled. Preferably, the distortion signal that is extracted is a second order distortion signal, but higher order distortion signals can be extracted and sampled as desired. The power of such a second order distortion signal can be approximated by a parabolic function of bias around the minimum distortion bias point. The control algorithm find the minimum of that parabola or a point offset from the minimum as needed. In step 630, the EAM bias voltage is modulated based on the sampled distortion signal.

Figure 8:
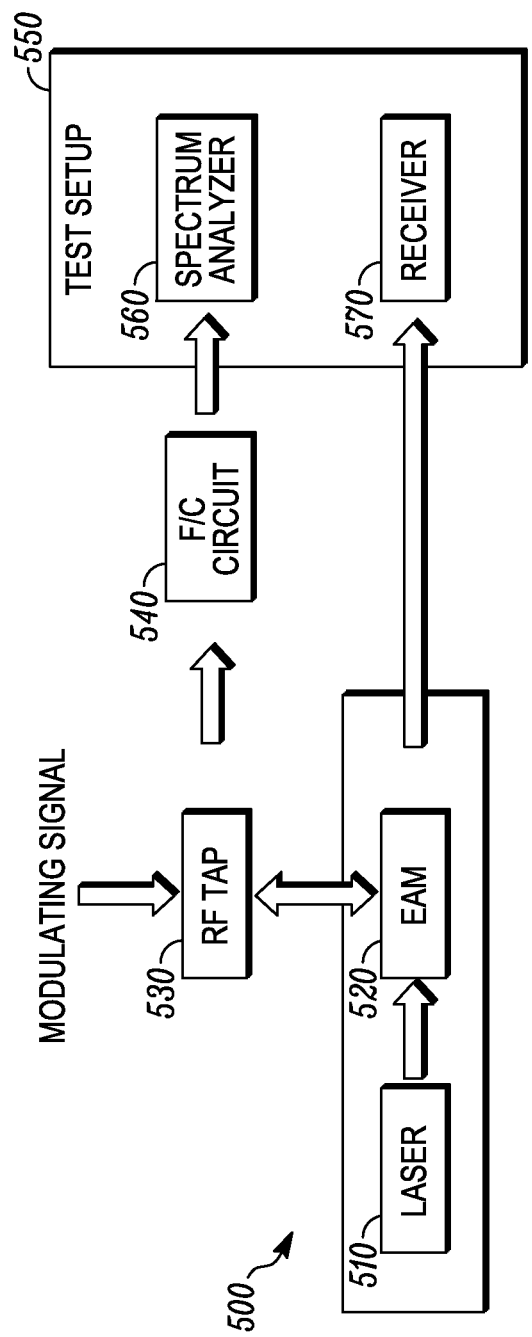
FIG. 8 shows a test arrangement for measuring the performance of the system of FIG. 6
Figure 9:
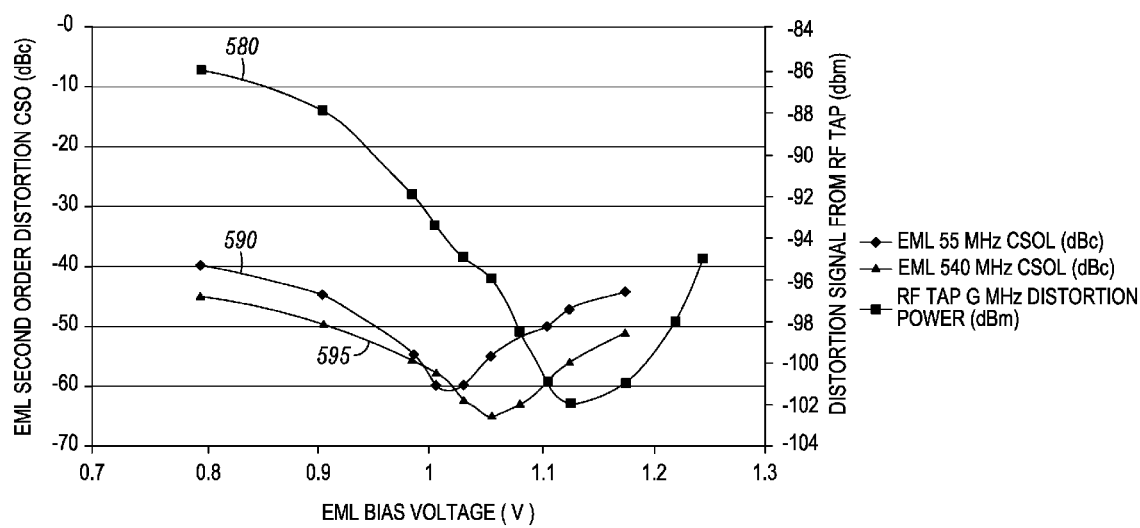
FIG. 9 shows results of the test system of FIG. 6.

FIG. 8 shows a test apparatus 550 used to test the correlation between the distortion in the input to the EAM of FIG. 6 and the distortion in the output of the EAM 520 of FIG. 6. Specifically, the amount of distortion detected in the output the spectrum analyzer 560 is sent to the feedback/control unit (reverse arrow in FIG. 540 that also monitors the amount of distortion detected at the RF tap 530, while the output of the EAM 520 is sent to a receiver 570 which receives the distortion of the EAM along with the optical signal and provides that to the spectrum analyzer 560. FIG. 9 charts the second order RF tap distortion power at 6 MHz (line 580) as monitored by the feedback/control unit, the second order distortion of a 55 MHz EML signal (line 590), and the second order distortion of a 540 MHz EML signal (line 595) as available from the spectrum analyzer. It can be seen that there is an optimal bias point to achieve the least second order distortion, as shown by the absolute (and local) minima of each of the curves. These distortion measurements are available to the feedback/control unit 540 as shown in FIG. 8. It can also be seen that there is a strong correlation between the EAM second order distortion and the distortion signal from the RF tap. Hence, this signal can be used by the feedback/control unit 540 to reach an optimal bias value for the modulator. In case the distortion measured by the spectrum analyzer is low enough at the minimum of the distortion measured at the RF tap 580 then the feedback/control unit can simply hold the distortion measured at the RF tap 580 at a minimum. In case there is an offset as shown in FIG. 9 then the feedback/control unit can hold the distortion measured at the RF tap 580 at an offset from the minimum. In either case, after calibration with the test system 550 there is no longer a need for the feedback/control 540 unit to be connected to the spectrum analyzer 560, merely controlling the bias point to hold the distortion measured at the RF tap 530 at a minimum or desired offset is sufficient to hold the distortion from the modulator at a low point. Although only shown for second order distortion, it is in general valid for any other order of distortion products. The photocurrent from the EAM exhibits strong correlation to the distortion profile of the EML.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the claimed subject matter is defined and limited only by the claims that follow.

The invention claimed is:

1. A system comprising:
a modulator that has a first input for receiving an optical signal from an optical transmitter, a second input for receiving an electrical signal used by the modulator to modulate the optical signal, and an output for outputting a modulated optical signal, the modulator having a variable bias; and
a controller that measures distortion from the electrical signal input to the second input of the modulator and uses the distortion measured from the electrical signal input to vary the bias of the modulator, wherein the distortion measured from the electrical signal input is measured independently from distortion in the outputted modulated optical signal.

2. The system of claim 1 where the modulator is free from being operatively connected to a coupler.

3. The system of claim 1 where the controller selects a bias of the modulator that minimizes distortion produced by the modulator.

4. The system of claim 3 where the distortion minimized by the controller is a second order distortion.

5. The system of claim 3 where the distortion minimized by the controller is higher than a second order distortion.

6. The system of claim 1 where the optical transmitter is a laser integrally formed with the modulator.

7. The system of claim 1 where the modulated optical signal is output to a fiber optic network delivering content from a selected one of a head end to a node and a node to a head end.

8. A system comprising:
a transmitter having a modulator that has a first input for receiving an optical signal from a laser, a second input for receiving an electrical signal used by the modulator to modulate the optical signal, and an output for outputting a modulated optical signal, the modulator having a variable bias; and
a controller that receives distortion produced by the modulator and uses the distortion as feedback to control the bias of the modulator, where the distortion is measurable at the second input independently from distortion in the outputted modulated optical signal,
where the control of the bias of the modulator based on the distortion measurable at the second input is free from including a coupler operatively connected to the output of the modulator.

9. The system of claim 8 where the controller measures distortion from the electrical signal to the second input of the modulator and uses the measured distortion to vary the bias of the modulator.

10. The system of claim 8 where the controller selects a bias of the modulator that minimizes distortion produced by the modulator.

11. The system of claim 10 where the distortion minimized by the controller is a second order distortion.

12. The system of claim 10 where the distortion minimized by the controller is higher than a second order distortion.

13. The system of claim 8 where the laser is integrally formed with the modulator.

14. The system of claim 8 where the modulated optical signal is output to a fiber optic network delivering content from a selected one of a head end to a node and a node to a head end.

15. A method comprising:
modulating an optical signal from an optical transmitter by using an electrical signal;
delivering the modulated signal to a transmission network, the modulated signal having a distortion product reflected back in to the electrical signal;
measuring the distortion product from the electrical signal used to modulate the optical signal, wherein the distortion measured from the electrical signal is measured independently from distortion in the modulated optical signal;
using the distortion product measured from the electrical signal to minimize the distortion product.

16. The method of claim 15 including the step of splitting the electrical signal into a first path used to modulate the optical signal and a second path used to measure the distortion product.

17. The method of claim 15 where the optical signal is modulated by a modulator having a selectively variable bias, the method including the step of using the measured distortion product to vary the bias.

18. The method of claim 17 where the bias is varied to minimize the distortion product.

19. The method of claim 16 where an RF tap splits the electrical signal into the first and second paths, respectively.

20. The method of claim 15 where the distortion product is higher than a first order distortion.

* * * * *